United States Patent [19]

Mohapatra et al.

[11] Patent Number: 5,289,454
[45] Date of Patent: Feb. 22, 1994

[54] OPTICAL DISC ADDRESSING DEVICES A METHOD OF USE THEREOF

[75] Inventors: Sarat K. Mohapatra, Woodbury; William C. Tait, Oak Park Heights, both of Minn.

[73] Assignee: Minnesota Mining and Manufacturing Company, St. Paul, Minn.

[21] Appl. No.: 810,213

[22] Filed: Dec. 19, 1991

[51] Int. Cl.$^5$ .................................................. G02B 6/00
[52] U.S. Cl. .............................. 369/112; 369/44.12; 385/132; 385/42
[58] Field of Search ............... 369/112, 109, 110, 122, 369/44.12, 44.23, 44.14, 44.11; 385/38, 41, 42, 49, 132

[56] References Cited

U.S. PATENT DOCUMENTS

| | | | |
|---|---|---|---|
| 4,070,092 | 1/1978 | Burns . | |
| 4,074,085 | 2/1978 | Russell | 179/100.3 B |
| 4,298,974 | 11/1981 | Tsunoda et al. | 369/45 |
| 4,478,483 | 10/1984 | Sprague | 365/112 |
| 4,515,428 | 5/1985 | Findakly | 385/42 |
| 4,566,090 | 1/1986 | Eberly | 369/46 |
| 4,752,922 | 6/1988 | MacAnally et al. | 369/32 |
| 4,775,207 | 10/1988 | Silberberg . | |

(List continued on next page.)

FOREIGN PATENT DOCUMENTS

| | | | |
|---|---|---|---|
| 0174008 | 3/1986 | European Pat. Off. | G11B 7/12 |
| 0338864 | 10/1989 | European Pat. Off. | G11B 11/10 |
| 1-112537 | 5/1989 | Japan | G11B 7/14 |

OTHER PUBLICATIONS

Suhara et al., "An Integrated Optic Disc Pickup Device," 5th IOOC-11th ECOC 1985, Venezia, Italy, Oct. 1985, pp. 117-120.
Jackel et al., "Damage-resistant LiNbO$^3$ Waveguides," 55(1) J. Appl. Phys. 269 (1984) pp. 269-270.
Nishimura and Murata, Paper No. WA2-1, Optical Data Storgae Topical Meeting, Jan. 17-19 (1989) pp. 70-73.
Altman et al., 31—1 RCA Engineer (Jan./Feb. 1986) "Optical Storage for High Performance Applications in Late 1980's and Beyond".
A. Neyer, 19(14) Electronics Letters 553 (1983) "Electro-Optic K-Switch Using Single-Mode T:LinbCO$_3$ Channel Waveguides".
Alferness, "Titanium-Diffused Lithium Niobate Waveguide Devices," in Guided-Wave Optoelectronics 145-153 (T. Tamir ed. 1979).
Yoon et al., 8(2) J. of Lightwave Technology 160 (1990)

(List continued on next page.)

Primary Examiner—Paul M. Dzierzynski
Assistant Examiner—Drew A. Dunn
Attorney, Agent, or Firm—Gary L. Griswold; Walter N. Kirn; Carolyn V. Peters

[57] ABSTRACT

A method reading an optical disc such that a light beam is launched from a laser diode into an array of waveguides that are serially demultiplexed or addressed in parallel onto a multiplicity of data tracks, such that the number of data points read, simultaneously or sequentially across the width of the disc are limited by the rotational speed of the optical disc, and an optical head using an array of waveguides for the optical guidance of the light beam, such that the array of waveguides is disposed on a substrate and wherein the light beam can be switched by a switching means between separate channels in the array by means of an applied potential; an error tracking channel, such that when the error tracking channel detects the misalignment of the optical head, a signal generated from the error tracking channel causes the optical head to realign; and optionally, a dump channel, such that light directed into the dump channel is directly radiated into the substrate, or through the dump channel and then into the substrate.

10 Claims, 7 Drawing Sheets

U.S. PATENT DOCUMENTS

| | | | |
|---|---|---|---|
| 4,787,076 | 11/1988 | Deguchi et al. | 369/46 |
| 4,796,226 | 1/1989 | Valette | 365/122 |
| 4,801,184 | 1/1989 | Revelli . | |
| 4,991,160 | 2/1991 | Premji | 369/44.12 |
| 5,191,624 | 3/1993 | Ito et al. | 369/44.11 |
| 5,195,152 | 3/1993 | Gupta | 369/121 |

OTHER PUBLICATIONS

"Polarization-Independent $LiT_aO_3$ Guided-Wave Electronic Switches" pp. 160–163.

Nishihara, Optical Integrated Circuits 194–199 (Electro-optical Eng. Series 1989) pp. 194–199.

Leonberger et al., 17 Applied Optics 2250 (1978) "Wavelength Dependence of GaAs Directional Couplers and Electroptic Switches" pp. 2250–2254.

Lytel, 1216 Applications of Electro-optic Polymers to Integrated Optic Devices 30 (SPIE 199) pp. 30–40.

Loni et al., "Proton-exchanged, lithium niobate planar-optical waveguides: Chemical and Optical Properties and Room-Temperature Hydrogen Isotropic Exchange Reactions," 61(1) J. Appl. Phys. (1987) pp. 61–66.

Koai et al., "Modeling of $Ti:LINbO_3$ waveguide devices: Part II-S-shaped channel waveguid bends," 7 J. of Lightwave Technology 1016 (1989) pp. 1016–1022.

OPTICAL DISC ADDRESSING DEVICES A METHOD OF USE THEREOF

BACKGROUND OF THE INVENTION

1. Field of the Invention

The invention relates to electro-optic devices and in particular to waveguide array devices and digital optical devices.

2. Description of Related Art

Optical waveguides, either active or passive have been fabricated from semiconductor, inorganic or organic materials. Optical waveguide switches have been reported in telecommunication and sensor applications.

Waveguides can be fabricated from a number of different materials, most of which may be categorized as crystalline or amorphous. Such materials exhibit an electro-optic effect that is broadly defined to include changes in the index of refraction, as well as an electroabsorptive effect, which is a change in absorption, and both effects are caused by the application of an electric field to a material through which light is propagating. A semiconductor waveguide can be fabricated by growing successively crystalline layers, for example, successive layers of GaAlAs, GaAs, and GaAlAs. Other examples of materials that are useful in fabricating waveguides are lithium niobate ($LiNbO_3$), lithium tantalate ($LiTaO_3$), zinc oxide (ZnO), and glassy polymers, doped with non-linear optical moieties.

This ability to alter the index of refraction with an electric field is useful for fabricating optical integrated circuit switches, modulators, and directional couplers. Single mode waveguides on the order of several wavelengths in cross-section are being constructed in electro-optic media making use of the technology used to make microelectronic circuits. Laser light is coupled into these guides and directed through different types of switching elements that can switch as fast as or greater than electrons can be directed through electronic chips. These circuits are generally referred to as photonic chips and have considerable potential for use in optical recording, telecommunication, computing and imaging graphics.

European Patent Application 338 864 A2 (Miyauchi et al.) discloses an integrated magneto-optical playback head using a discrete light source, a waveguide to direct the light onto the optical disc and a second waveguide to guide the reflected light for differential detection by photodetectors.

An integrated-optic disc pickup device (IODPD) has been proposed by Suhara et al., "An integrated optic disc pickup device," 5th IOOC-11th ECOC 1985, Venezia, Italy, October 1985). The IODPD device was constructed by integrating a focussing grating coupler, a grating beam splitter and photodiodes in a thin film waveguide on a single substrate. The device is a single channel device and is suitable for a non-erasable optical disc media. Although the inertia of the system is reduced in this integrated pickup device, focussing grating coupler is wavelength sensitive.

European Patent Application 0 174 008 (Inoue et al.) describes an integrated optical head using Fresnel lenses, focussing grating couplers and displaced photodiodes for tracking, error and signal detection.

U.S. Pat. No. 4,801,184 (Revelli) describes an optical head for reading and writing on non-erasable optical disc where the laser light is guided in a slab waveguide and is focussed onto the optical disc by means of an electrooptic focussing grating coupler fabricated on the same substrate. The reflected light is differentially read by means of photodetectors positioned on the opposite side of the substrate for focussing and tracking control. This invention is useful for bit-at-a time recording and is not suitable for magneto-optic media.

U.S. Pat. No. 4,796,226 (Valetta) describes a novel integrated optic reading head for reading information from an optical disc. The head reads information in a serial fashion using an interference technique. Unlike conventional optical heads, the optical head described in Valetta requires only a small spacing between the disc and the optical head.

Several parallel addressing schemes using laser arrays have been reported in the literature, see for example, K. Nishimura, and S. Murata, Paper No. WA2-1, Optical Data Storage Topical Meeting, Jan. 17-19, 1989, SPIE and W. P. Altman et al., 31-1 RCA Engineer (January/February 1986). In these cases 5-9 laser diode arrays are used to address 5-8 bits on an optical disc. Temperature rise of the laser arrays, mode hopping, wavelength shift and yield are some of the associated problems of the laser array scheme.

U.S. Pat. No. 4,074,085 (Russell) describes an optical recording playback apparatus for simultaneously scanning a plurality of data tracks on an optical record. The device uses separate laser beams, bulk optics and galvos for scanning. The system is not an integrated optic device scheme.

U.S. Pat. No. 4,298,974 (Tsunoda et al.) describes an optical head for a videodisc player/recorder comprising a semiconductor laser array as light source for reading and writing multiple tracks and an optical system that guides laser beams from the array to a predetermined recording medium.

U.S. Pat. No. 4,070,092 (Burns) describes a T switch as an active optical-waveguide branch that includes a single main waveguide branched into two element arms or paths such that optical radiation passing through the main waveguide will be normally divided equally into each branched arm. Electrodes, formed between the branching arms can selectively be made positive or negative with respect to a center electrode, thus permitting the selection of one branch of the Y switch versus the other, depending on the polarity of the potential applied.

U.S. Pat. No. 4,775,207 (Silberberg) describes a digital optical X switch having a switching on/off ratio greater than 1000:1. The electro-optic switch is implemented on a substrate which includes first and second waveguides of unequal width and a central region in which light from the two input waveguides converge. Electrodes for generating an electric field are disposed adjacent to the central region and for switching beams of light from the first to second output waveguide in a step-like manner.

SUMMARY OF THE INVENTION

Briefly, in one aspect of the present invention, a method is provided for reading and writing bits of information on an optical disc using a bit serial or a parallel addressing scheme comprising one or more laser diodes and a means for propagating light emitted from the laser diodes through electro-optic waveguide arrays.

In another aspect of the present invention, an optical head is provided comprising:

(a) a light source emitting a light beam;

(b) an array of waveguides for the optical guidance of the light beam, such that the array of waveguides is disposed on a substrate and wherein the light beam can be switched by a switching means between separate channels in the array by means of an applied potential;

(c) an error tracking channel, such that when the error tracking channel detects misalignment of the optical head, a signal generated from the error tracking channel causes the optical head to realign;

(d) optionally, a dump channel, such that light directed into the dump channel is directly radiated into the substrate, or through the dump channel and then into the substrate; and (e) a first sensing means to detect focussing and tracking errors; and (f) a second sensing means to sense and process data read from the optical disc.

The array of waveguides is arranged in a bit serial addressing scheme, such that only one of the channels of the array can read or write at a time or the array of waveguides is arranged in a parallel addressing scheme, such that all the channels of the array can read or write simultaneously. Furthermore, the switching devices to alter the light path of the light emitted from the laser diode may be directional couplers, cut-off or electro-absorption modulators, digital optical switches, such as, Y switches or X switches.

BRIEF DESCRIPTION OF THE DRAWING(S)

FIGS. 1(a) to (c) are schematic representations of optical multiplexer/demultiplexer waveguide arrays, and in particular:

(a) shows a 1×9 optical demultiplexer;

(b) shows a 1×9 intersecting optical waveguide switches; and (c) shows a parallel addressing scheme, where the output is controlled by an interaction region.

DESCRIPTION OF THE PREFERRED EMBODIMENT(S)

Devices of the present invention are based upon a multiplicity of waveguides known as optical demultiplexers. The method for addressing, that is, reading and writing of an optical disc using optical demultiplexer can be based on optical waveguides. For example, a directional coupler can have a pair of waveguides in close proximity, that is, approximately 5 to 15 micrometers center to center. Under the application of an electric field, the index of refraction of the waveguides can be altered. An electrical field, E, produces a small but significant change, $\Delta n$, in the index of refraction, n, as defined by $$\Delta n = n^3 \cdot r \cdot E / 2$$

where r is the electro-optic coefficient that determines the magnitude of this change. For example, $r = 30.0 \times 10^{-6}$ micrometers/volt in $LiNbO_3$.

Alternatively, carrier injection into the waveguide region can also induce a reduction in the refractive index of the waveguide. Refractive index changes are also possible with third order non-linear effects, such as $\chi^{(3)}$. In the passive state, for example, if light is launched into a first channel, light could emerge from the first channel or a second channel, provided the two channels are in close proximity and depending on the interaction length, symmetry, and the like. Altering the refractive index by an appropriate amount of any of the above means of one waveguide with respect to the other waveguide will change the direction of the emerging light, for example, from the first channel to the second channel.

A cut-off modulator is an electro-optic device where light is switched from the waveguide to the substrate under the application of an appropriate electric field. Alternatively, an electro-absorption device is an electroabsorptive device.

For example, a conventional addressing scheme uses a single laser diode and reads or writes one bit of information at a time on the optical disc. The writing speed characteristic of such a system is governed by the rotational speed of the optical disc.

Figure 1A:
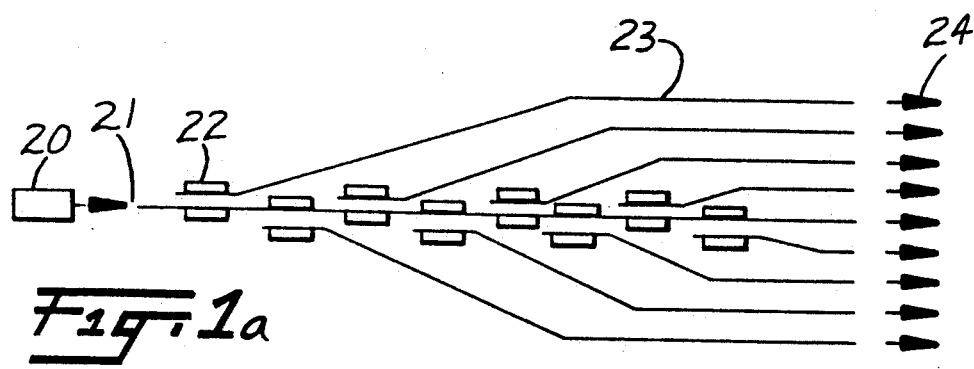
Figure 1B:
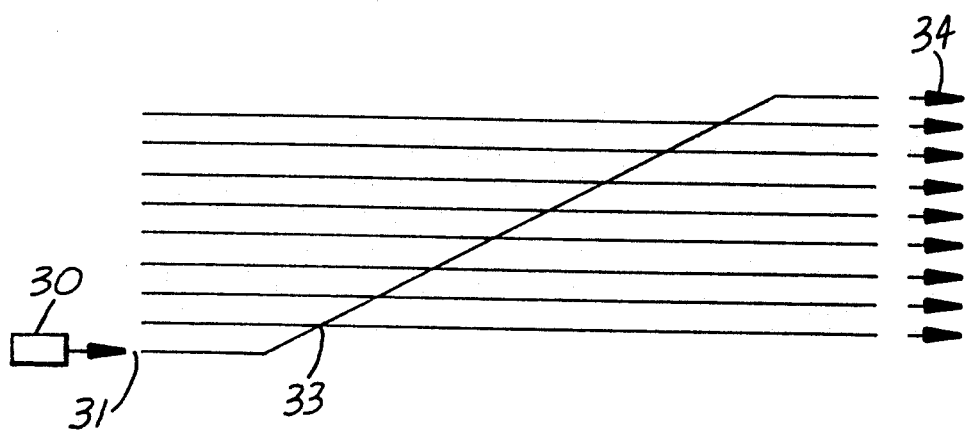
Figure 1C:
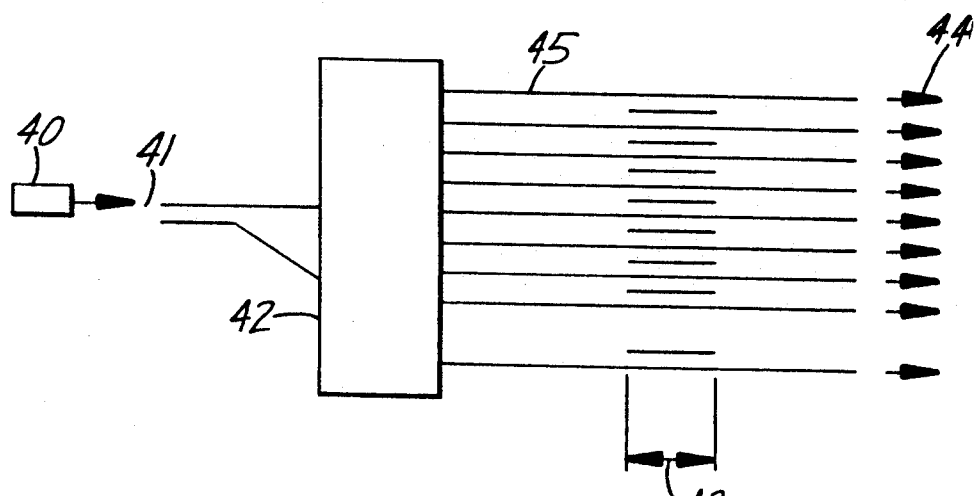

Several alternative addressing schemes, contemplated in the present invention for addressing optical discs, based on a multiplicity of waveguides are schematically shown in FIGS. 1(a) to (c). Referring to FIG. 1(a) a 1×9 optical demultiplexer operated in the bit serial addressing scheme is shown. A beam of light is launched from a laser diode 20 with P milliWatts (mW) of power into central channel 21. Laser diode 20 typically has a power capability ranging from 1 to 150 mW. Typically, output 24 from each channel is in the range of 8 to 20 mW, the amount of power typically required for writing a bit of data to an optical disc. An example of an optical switch 22 that permits alteration of the light path through a particular waveguide channel 23 is a directional coupler switch. An optical switching device 22 is used to alter the light path of the light beam launched into the central channel 21. Directional couplers illustrated in FIG. 1(a) are based upon the electro-optic effect wherein a change of refractive index, and therefore the propagation constant of light, is affected by the application of an electric field to the one or both channels involved in the switching of the light path. In a typical writing process light is switched from the center channel to various other channels in a faster sequence. Each channel will write one bit of information.

FIG. 1(b) illustrates a bit serial addressing scheme using intersecting waveguides. Light is launched from a laser diode 30 into channel 31 through intersections 33 to output 34. An electro-optic effect is used at the intersection 33 of the waveguides to confine the light into the appropriate channel. Intersecting waveguides for switching of light have been described in the literature, see A. Neyer, 19(14) *Electronic Letters* 553 (1983).

A parallel addressing scheme is shown in FIG. 1(c). In this scheme, light 41 is launched initially from a laser diode 40 into all channels simultaneously through a set of passive or active splitters 42. Each channel 45 is associated with an active region 43 to modulate and control the output intensity of light 44 from that channel. Unlike the bit serial addressing scheme, this will require ~N×P mW of power to drive the N channels. Typically, region 43 could be an optical switch, such as a directional coupler switch, or cut-off or electro-absorption modulators, or digital optical switches, such as a Y switch or an X switch. The operating mechanism in a cut-off modulator is the electro-optic effect and in an electro-absorption modulator is the electro-absorptive effect, that is, changes in absorption coefficient of the material by the application of an electric field.

Figure 2:
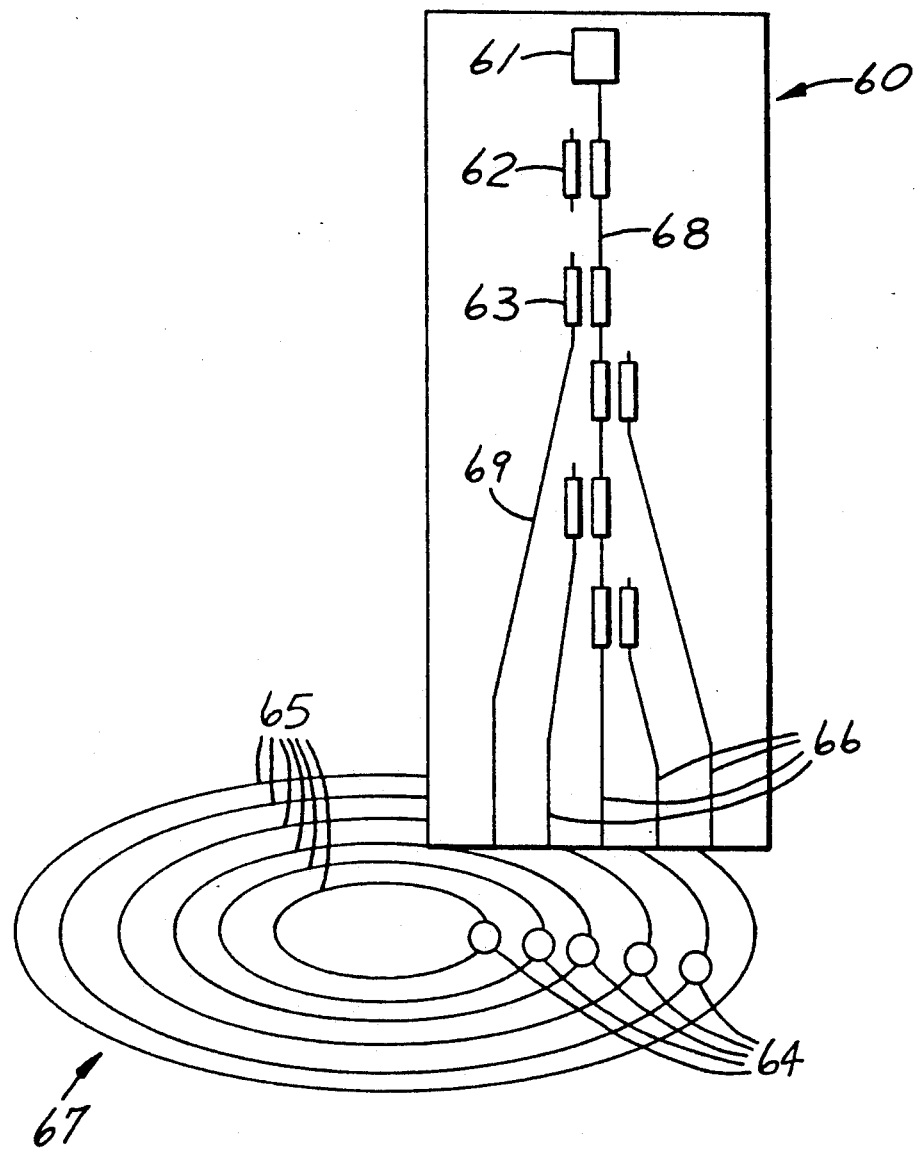
FIG. 2 is a schematic representation of an optical disc addressing scheme using 1×5 coupler operating in a bit serial mode.

A schematic diagram of the optical disc addressing scheme using a 1×5 coupler is shown in FIG. 2. This scheme is used in a bit serial addressing mode such as described in reference to FIGS. 1(a) to (b) for reading and writing recorded bits 64 of data from tracks 65 on an optical data disc. The intermediate optics between the disc 67 and the demultiplexer chip 60 necessary for reading and writing has been omitted for brevity. The intermediate optics are described in patents (U.S. Pat. Nos. 4,787,076 (Deguchi et al.), and 4,566,090 (Eberly)) and such descriptions are incorporated herein by reference. The addressing configuration in FIG. 2 illustrates an integrated laser diode 61 on the chip 60. This configuration has the advantage of monolithic integration of laser diode 61, waveguide arrays, and driver electronics for driving the laser diode and waveguide arrays. A first sensing means is used to detect focussing and tracking errors and such means are well-known in the art and are described for example in U.S. Pat. No. 4,566,090 (Eberly) and 4,787,076 (Deguchi et al.) and such descriptions are incorporated herein by reference. A second sensing means is used to sense and process data and such means are well-known in the art and are described for example in U.S. Pat. No. 4,752,922 (MacAnally et al.) and such description is incorporated herein by reference.

It is also permissible to have a construction wherein the laser diode operates external to the waveguide arrays. In the latter configuration, light from the laser diode 61 is focussed onto the end facet of the central waveguide channel 68. The light from the central channel 68 is directed through the various channels 66 by incorporating a series of optical switches 63, positioned in the waveguide array, to electronically control the path of the light emitted from the laser diode 61. For example, optical switch 63 can be a directional coupler. Alternatively, optical switch 63 can be digital optical switch, as discussed hereinbelow.

In the conventional approach currently being used, the laser diode is switched off and on is used only for a short fraction of the bit addressing time. In such a scheme, the laser diode operates in a low duty cycle, which results in a slow data rate. In contrast, the laser diode 61, in the addressing scheme of the present invention operates essentially in a continuous wave (CW) mode.

In the present invention, see FIG. 2, a dump channel 62 is used to radiate the power of laser diode 61 to the substrate when there is no addressing of the disc. The dump channel 62 is an active directional coupler, where optical power is transferred from the central channel to the dump channel on demand. "Dump channel" as used in this application can be a separate dedicated channel through which the laser diode power can be radiated into the substrate or alternatively, the dump channel can also be used to identify the process of directly radiating the laser diode power into the substrate via a radiation mode of operation, for example, the light is launched into one of the branches of a Y switch, with the output power propagating into the main branch (stem of the Y switch) to the recording media, or the power radiates directly into the substrate. The same embodiment also shows a tracking channel 69, which tracks and aligns the optical head (not shown) onto a track 65, and generates an error signal when the optical head (not shown) is displaced from the track 65. The generated error signal, through appropriate electronic circuitry realigns the optical head (not shown) onto track 65 through a tracking servo system. Operationally, tracking channel 69 is an active or passive waveguide that splits a small fraction of power, for example, 1 to 2 mW power from the central channel 68. The tracking channel 69, as shown is an active directional coupler.

Another aspect of the present invention is an integrated photonic chip comprising digital optical switches. Advantageously, the digital character of the chip permits the on/off switch ratio to be high, when an applied electric field is above a predetermined threshold value. Thus, a single applied potential can be used to drive more than one switch in parallel, which can produce a significant reduction in the number of drivers and external connections required. Additionally, the digital character of the photonic chip offers considerably more latitude in the manufacturing process and flexibility in performance as compared to the analog counterpart of the present invention. Alternatively, the digital switch, such as a "Y switch" or an "X switch" can also be operated in an analog mode.

Figure 3:
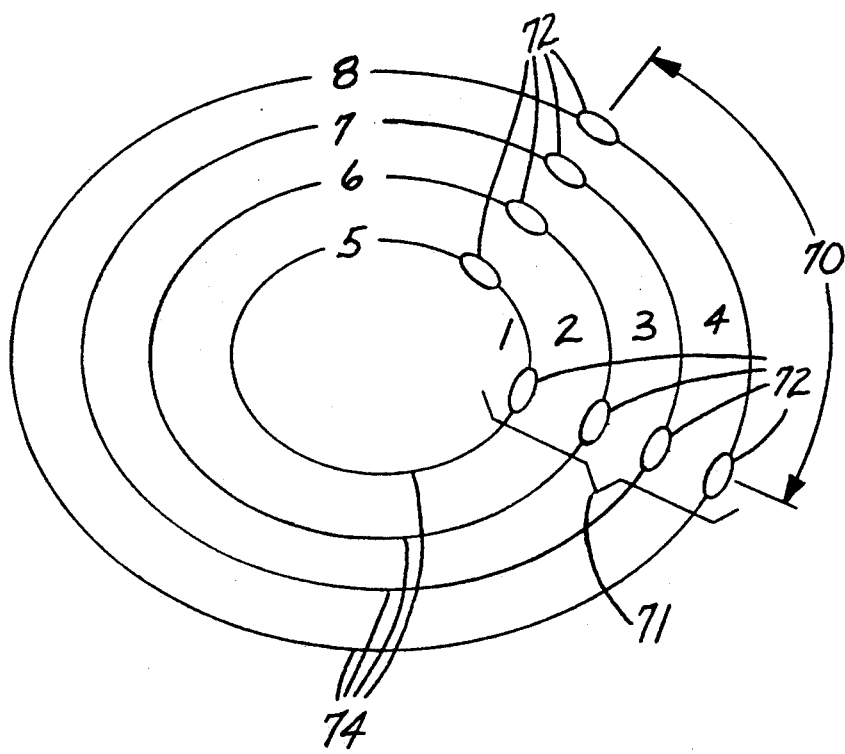
FIG. 3 is a schematic representation of a track addressing timing by 1×4 waveguide array of FIG. 2.

Referring to FIG. 3, for the purpose of illustration and not intending to be limited to the details shown, consider the operational aspects of a bit serial addressing scheme for writing onto a 14 inch (35 cm) optical disc (schematically shown) having a rotational speed of 1400 rpm and a bit spacing 70, that is the spacing between two bits 72 of data on the same track, of 2 $\mu$m on a single track 74. The time between addressing two sequential bits of data on a single track is 76 nsec. The energy typically required to write a bit 72 is ~200 pJoules. This can be achieved with approximately 20 mW of output power from each waveguide with an addressing time of 10 nsec. With a waveguide to waveguide switching speed of ~2 nsec, the time to address 4 bits 71 on four (4) adjacent tracks 74 will take 48 nsec. It is important to realize that the time to address 4 bits (in this case) should be less than the time to reach the next bit along the first track. The bit access time along a track, that is, 76 nsec is greater than the writing time for 4 bits of information 71 across four adjacent tracks 74.

Figure 4:
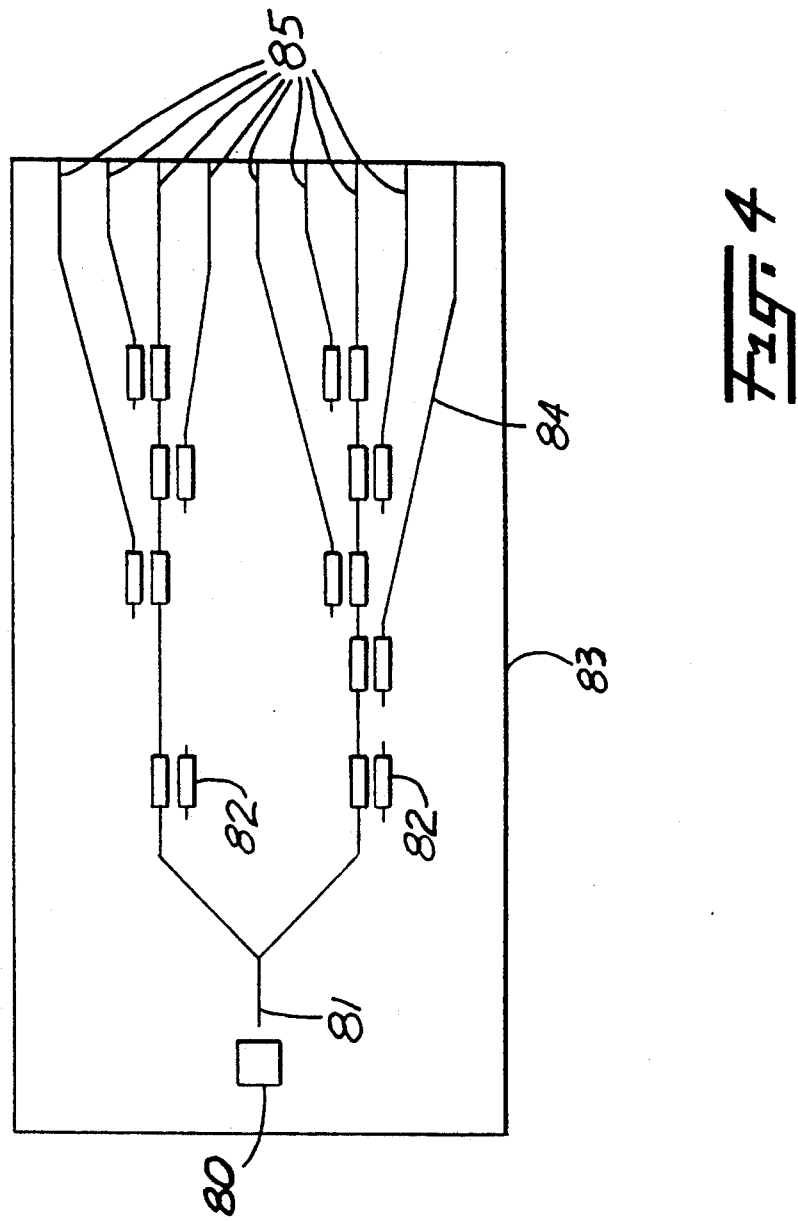
FIG. 4 is a schematic representation of an optical disc addressing scheme using 1×9 coupler operating in a bit serial mode.

Multiple bit addressing beyond 4 bits of data at a time using the bit serial addressing is possible by increasing the laser power and the switching rate of the waveguide channels. This scheme uses a single laser diode like a conventional one bit addressing scheme used currently, but has the added advantage of higher data rate. Alternatively, two laser diodes can be used to address 8 bits (4 channels per laser) giving an 8-fold increase in the data rate. A single laser diode with higher power (~100 mW) can be passively split into two sets of 4-bit data addressing channels as shown in FIG. 4. Referring to FIG. 4, a waveguide array is disposed on a substrate 83. Light from laser diode 80 is launched into a central channel 81 and split into two branches. Any power from the diode that is not channeled to output 85, can be switched into a dump channel via an optical switch 82. A trickle amount of power is diverted to tracking channel 84, thus enabling generation of an error signal, if the optical head (not shown) should become misaligned during the reading or writing operations.

Since the reading of optical discs require less power, that is, only 1 to 2 mW, a wavelength demultiplexer described earlier can be used easily in a serial or a parallel addressing scheme. Referring again to FIG. 1(c), and the parallel format, light is distributed into all the channels by switching appropriate fraction of light through electro-optic effect. Signals from the disc are sensed by some sensing means, for example, multiple detectors (not shown), such as photodetectors.

Figure 5:
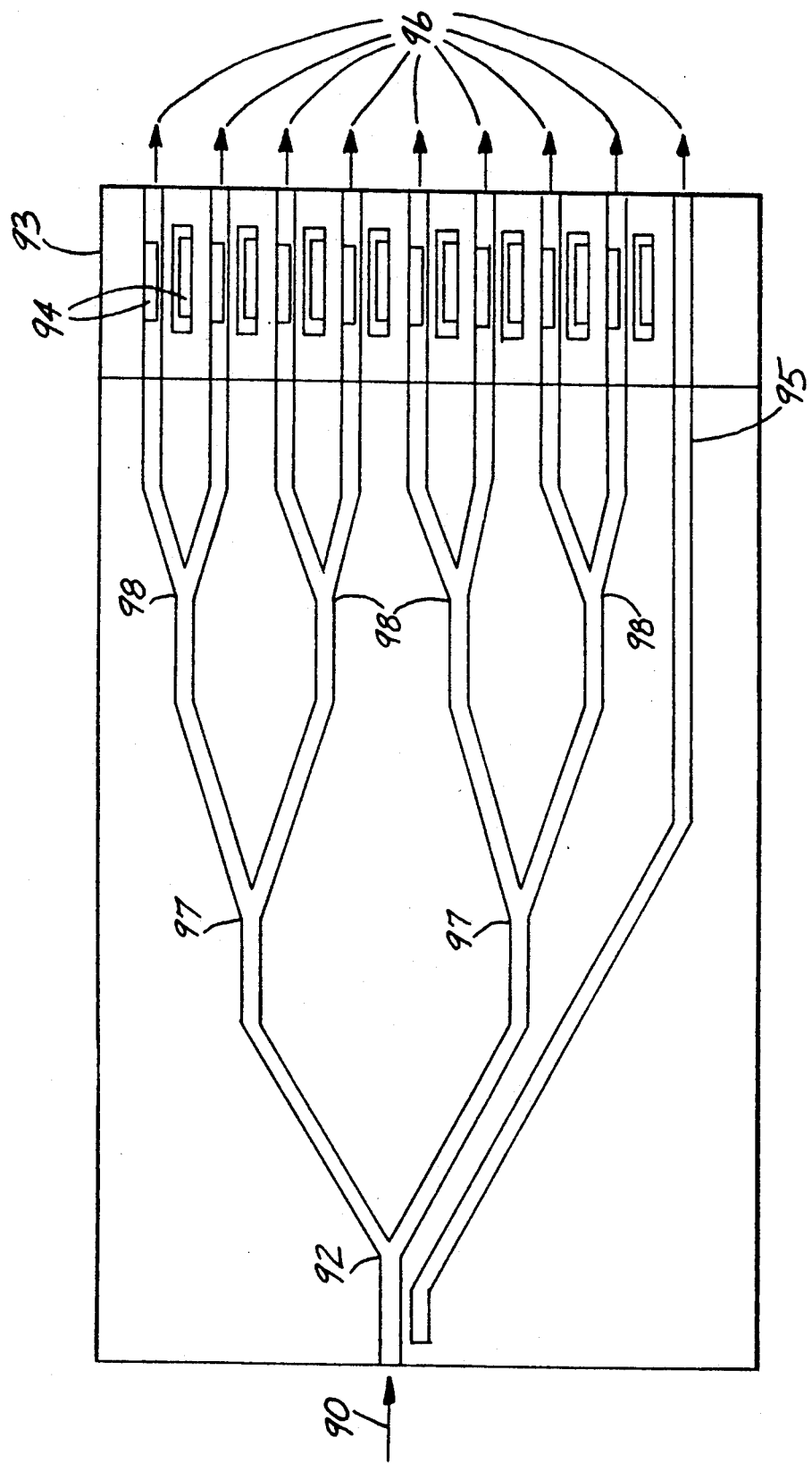
FIG. 5 is a schematic representation of a parallel addressing scheme using separate power splitters and modulators.

A parallel addressing scheme can be implemented as shown in FIG. 5 and it is not intended to limit the scope of the invention to the details shown, since various modifications and structural changes may be made without departing in any way from the spirit of the present invention. In this scheme, light 90 is divided sequentially through a passive section comprising a series of Y-splitters 92, 97, 98. Other means of splitting the power through waveguides such as directional couplers, intersecting waveguides etc. can be used. The active region 93 shown in FIG. 5 comprises a number of directional couplers 94. In such a scheme, light 90 is switched between the disc input waveguide channels A and output 96 is obtained from the nine output channels. A small portion of the input light 90 is passively tapped to a tracking waveguide channel 95 for feedback to a tracking servo. Since light is always present in the active channels, the minimum power of the laser diode is $$P_N \approx N \times (P_0 + P_L + P_X)$$

wherein N is the number of channels, $P_0$ is the power required to write a bit of information, $P_L$ is power loss due to transmission losses, and $P_X$ is power loss due to attentuation, splitting, coupling, insertion, etc.

Figure 6:
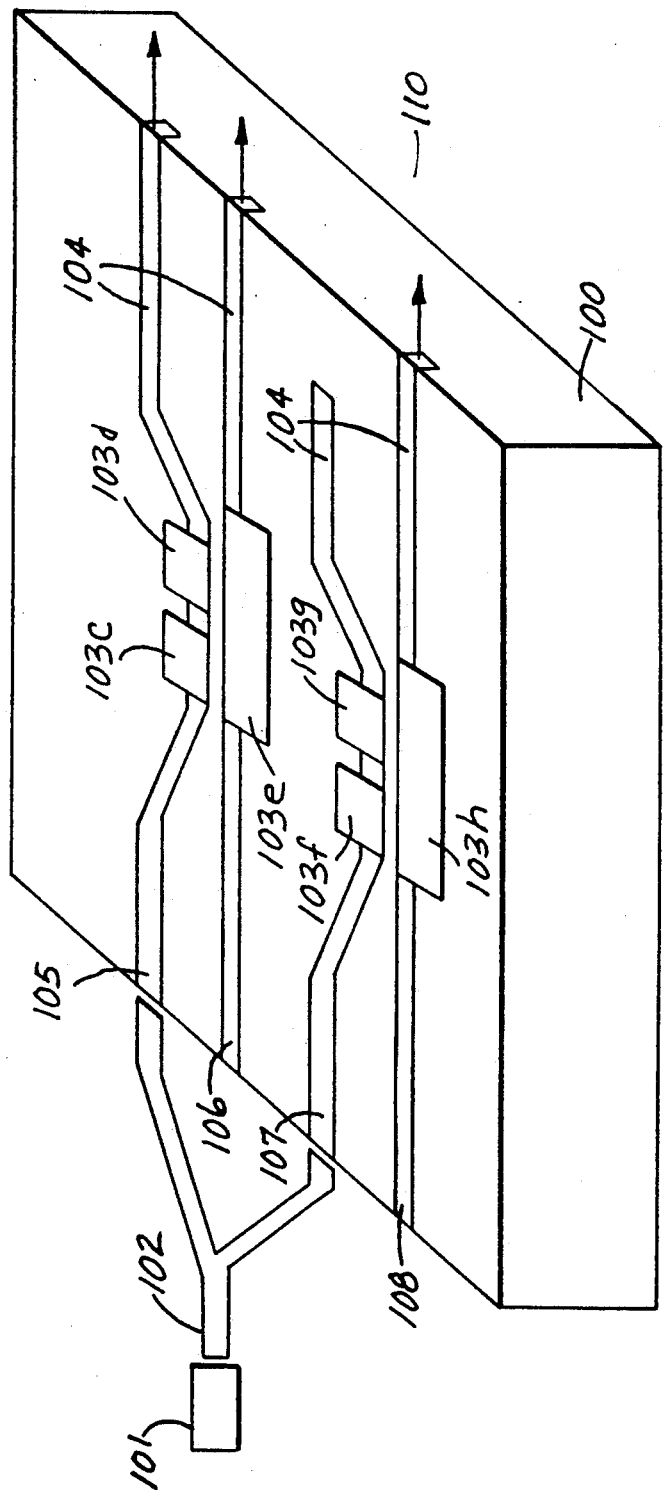
FIG. 6 is a schematic representation of a digital optical modulator photonic chip.

For demonstration of the basic concept and referring to FIG. 6, a Ti-diffused LiNbO$_3$ directional coupler array is illustrated. The device 100 was fabricated by diffusing titanium in the waveguide regions 104 at elevated temperature (~1000° C.) in an O$_2$/H$_2$O atmosphere. Device 100 fabrication is well known, such as described in Alferness, "Titanium-Diffused Lithium Niobate Waveguide Devices," in *Guided-Wave Optoelectronics* 145-53 (T. Tamir ed. 1979) and such description is incorporated herein by reference. Laser light 101 at wavelength of 1.3 μm was passively split with a passive splitter 102 into two branches (105 and 107) and coupled to two separate channels each having two directional couplers. Light 101 was switched between channel 105 and channel 106 by applying voltage to the electrodes 103c, 103d, and 103e. Part of the light 101 going in channel 107 was diverted to Channel 108 by applying suitable voltage to electrodes 103f, 103g, and 103h. This device operated as a two channel optical demultiplexer with a tracking channel in a bit-serial addressing mode as discussed in reference to FIGS. 1-4.

Although, the demonstrated device was fabricated with Ti-diffused LiNbO$_3$ directional coupler waveguide device, waveguide devices can be fabricated from any other electro-optic media, for example LiTaO$_3$ (Yoon et al., 8(2) *J. of Lightwave Technology* 160 (1990)), LiNbO$_3$ or LiNbO$_3$:H (H. Nishihara *Optical Integrated Circuits* 194-99 (Electro-optical Eng. Series 1989)), Al(Ga)As (Leonberger et al., 17 *Applied Optics* 2250 (1978)), Group II-VI semiconductors, and glassy polymers doped with nonlinear optical moities, such as described in Lytel, 1216 *Applications of Electro-optic Polymers to Integrated Optic Devices* 30 (SPIE 1990). LiTaO$_3$ is similar to LiNbO$_3$, but generally less prone to radiation damage.

Because of high power (that is greater than 5 mW) requirements during writing of information, it is important that the waveguide material is not sensitive to radiation damage. Ti-diffused LiNbO$_3$ material is generally not preferred for writing applications because of radiation damage at ~800 nm at the operating power level. Waveguides fabricated by proton diffusion into LiNbO$_3$ such as described in Loni et al, "Proton-exchanged, lithium niobate planar-optical waveguides: Chemical and Optical Properties and Room-temperature Hydrogen Isotropic Exchange Reactions," 61(1) *J. Appl. Phys.* 64 (1987), can be used for reading of optical disc with the above mentioned bit serial scheme. Materials such as Al(Ga)As, II-VI semiconductors, LiTaO$_3$, polymeric materials are candidate materials for the fabrication of waveguide array devices.

Switches in the form of directional couplers, preferably manufactured on a GaAs or a LiNbO$_3$ base are interferometric in nature, that is, they require a precise phase shift to achieve a switched state with low crosstalk. Any small changes in phase shifting resulting from fabrication variations requires slightly different voltages for each switching element in a switching array. Furthermore, the directional coupler switch is wavelength sensitive and operates satisfactorily only on a narrow wavelength range. Additionally, the directional coupler switch requires a precise voltage to define the switched states.

Advantageously, the addressing schemes illustrated and described in FIGS. 1-5 can be implemented using digital optical switches, such as a Y switch or an X switch. Switches that have a digital response are (1) insensitive to switching voltage variations, (2) insensitive to fabrication variations, and (3) permits operation over a broad band of wavelengths, eliminating the labor-intensive necessity of fine tuning each switch, as required with directional couplers. Switches, such as an X switch or a Y switch are electrically controlled optical switches having a step-like response to the switching voltage. In addition to operating the digital optical switches in a digital mode, that is, the output power varies in discrete steps, the digital optical switches may be operated in an analog mode, that is, the output power varies as a continuous function of the input. The digital optical switch can also be operated wherein the output power varies as a continuous function of the input.

Figure 7:
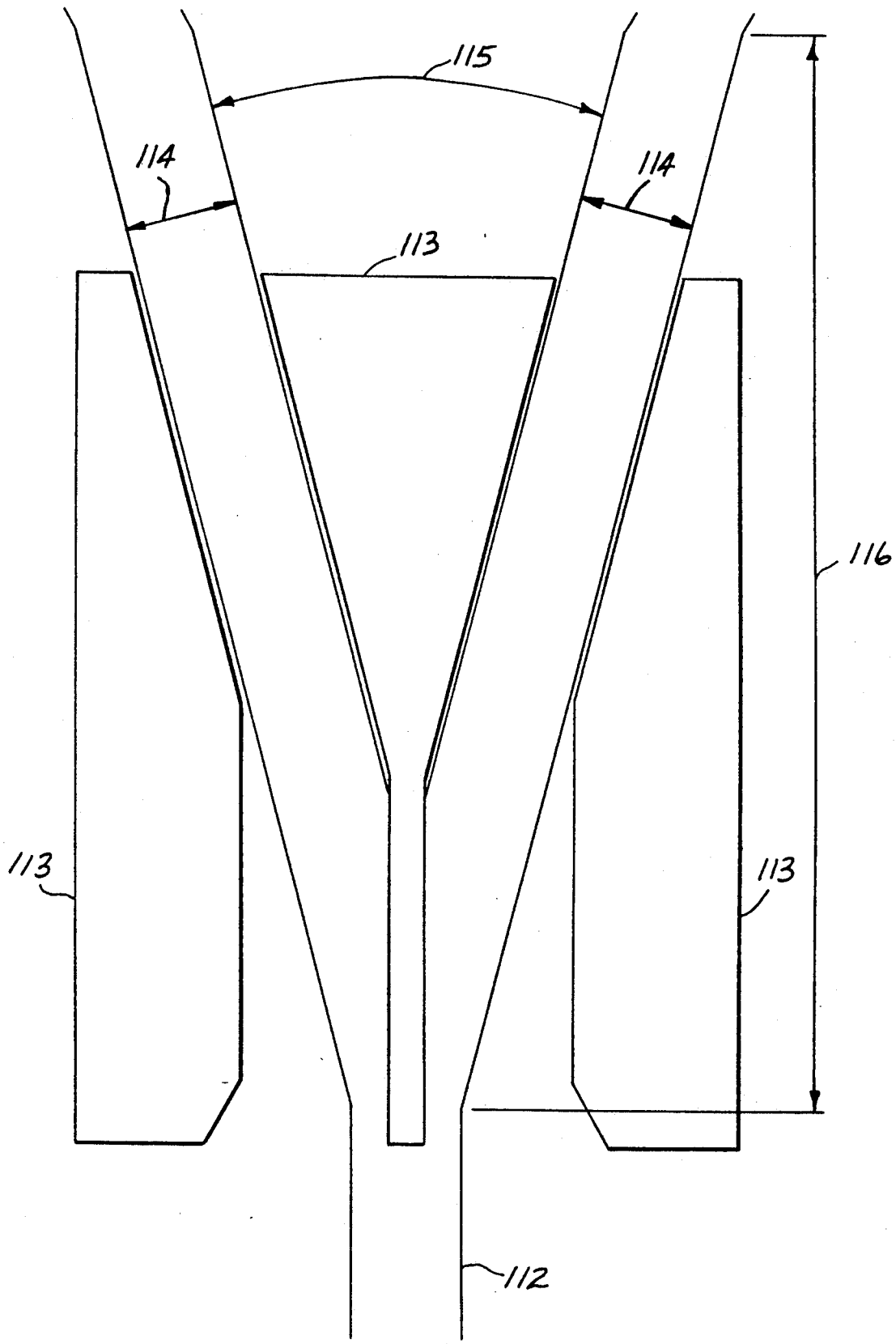
FIG. 7 is a diagramatic representation of a Y switch.

Referring to FIG. 7, an x-cut Y switch is shown. A Y switch is described in U.S. Pat. No. 4,070,092 and such description is incorporated herein by reference. The configuration of the switches, for example, Y switch configuration parameters, such as the guide width (W) 114, switch length (ξ) 116, and branch angle (θ) 115 are related to switch performance. Light 111 is launched into the base 112 from the bottom and propagates along the waveguide geometry defining the Y switch. The branch angle (θ) 115 between the two branches of the Y switch is small and S bends are used to spread out the guides to the appropriate separation, see Koai et al., "Modeling of Ti:LiNbO$_3$ waveguide devices: Part II-S-shaped channel waveguide bends," 7 *J. of Lightwave Technology* 1016 (1989). Three types of S bends are contemplated to determine that one will be used that minimizes radiative losses in the bends: sine (S), cosine (C), and constant radius (CR). A typical electrode configuration is shown in FIG. 7 and electrodes 113 necessary to control the propagation of the light into the designated branch of the switch are also illustrated.

An electro-optic device implementing the waveguide array addressing schemes of the present invention can be fabricated on a wafer of LiNbO$_3$, either x-cut or z-cut. Although the following procedure to fabricate an integrated photonic chip was employed, a variety of well-known semiconductor fabrication processes are contemplated and are within the scope of the present invention, such as described in Alferness, "Titanium-Diffused Lithium Niobate Waveguide Devices," in *Guided-Wave Optoelectronics* 145–53 (T. Tamir ed. 1979) and such description is incorporated herein by reference. First, a film of Ti was deposited to one side of the wafer by e-beam evaporation deposition. This layer of Ti functions as a chemical barrier layer protecting the substrate from lithium leaching during the proton exchange process. Next, a photoresist layer, as known in the art, is applied and the waveguide geometry is etched through the Ti film using an e-beam lithography mask designed for this purpose. The photoresist layer is then removed and the waveguides are prepared by using a proton exchange process, such as described in Jackel et al., "Damage-resistant LiNbO$_3$ Waveguides," 55(1) *J. Appl. Phys.* 269 (1984) and such description is incorporated herein by reference. The wafer is dipped in a bath containing benzoic acid (proton source) at an elevated temperature in the range of 175° C. for a fixed period of time, where the time period can range from 20 to 60 minutes, preferably in the range of 30 minutes. Then, the remaining Ti layer is removed by techniques known to those skilled in the art, such as chemical etching, solution dipping. The wafer is then annealed at a high temperature (350° C.), under atmospheric pressure for about 3-5 hours. Simultaneously, an optional layer of SiO$_2$ can be deposited to a thickness in the range of 2000 Å over the waveguides. In the z-cut medium, electrodes are deposited directly over the waveguides on top of the SiO$_2$. In the x-cut medium, electrodes are deposited on the sides of waveguides.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method for reading an optical disc comprising the steps:
   (a) launching a single light beam from a single laser diode into an array of waveguides that are serially demultiplexed or addressed in parallel onto a multiplicity of data tracks, such that the number of data points read, simultaneously or sequentially across the width of the disc are limited by the rotational speed of the optical disc, and
   (b) sensing the data read from the optical disc with a sensing means.

2. The method according to claim 1, wherein the array of waveguides that are serially demultiplexed onto a multiplicity of data tracks are switched by an analog switching means, or by a digital switching means.

3. The method according to claim 2, wherein the analog or digital switching means switches the light beam faster than the rotational speed of the optical disc.

4. The method according to claim 3, wherein the analog switching means is a directional coupler.

5. The method according to claim 3, wherein the digital switching means is a Y switch or an X switch.

6. An optical head comprising:
   (a) a single light source emitting a light beam;
   (b) an array of active waveguides for the optical guidance of the light beam, such that the array of active waveguides is disposed on a substrate and wherein the light beam can be switched by a switching means between separate channels in the array by means of an applied potential;
   (c) an error tracking channel, such that when the error tracking channel detects a misalignment of the optical head, a signal generated from the error tracking channel causes the optical head to realign;
   (d) optionally, a dump channel, such that light directed into the dump channel is directly radiated into the substrate, or through the dump channel and then into the substrate;
   (e) a first sensing means to detect focusing and tracking errors; and,
   (f) a second sensing means to sense and process data read from the optical disc.

7. The optical head according to claim 6, wherein the array of waveguides is arranged in a bit serial addressing scheme, such that only one of the channels of the array can be used to read or write at a time.

8. The optical head according to claim 6, wherein the array of waveguides is arranged in a parallel addressing scheme, such that all the channels of the array can be used to read or write simultaneously.

9. The optical head according to claim 6, wherein the array of waveguides is selected from the group consisting of directional couplers, Y switches, and X switches.

10. The optical head according to claim 6, wherein the switching means is an analog switch or a digital switch.

* * * * *